United States Patent Office 3,299,259
Patented Jan. 17, 1967

3,299,259
DEVICE FOR ACCUMULATING AND
INDICATING PULSE DATA
Lawrence S. Grygienc, Ronald E. Schauer, and Martin R. Winandy, Chicago, Ill., assignors to Automatic Electric Laboratories, Inc., Northlake, Ill., a corporation of Delaware
Filed Mar. 18, 1964, Ser. No. 352,785
4 Claims. (Cl. 235—160)

This invention pertains to the accumulation and recording of data from electromechanical computing equipment and particularly to the accumulation of data derived from gas orifice meter charts when they are processed on a mechanical computer such as the Rockwell Integrator.

Accordingly the object of the present invention is to provide means for counting the revolutions of the time plate, pressure plate and differential disc of a Rockwell Integrator and print this information for use in computing billing information for gas consumers.

A feature of this invention is the inclusion of facilities for accumulating and recording orifice meter chart information.

Another feature is the inclusion of photo detectors used to accurately count the revolutions of the time plate, pressure plate and differential disc in a Rockwell Integrator. These and other objects and features of the invention will be more clearly understood from the following specification which describes the preferred but not limiting the embodiment of the invention. This specification taken together with the appended claims and the accompanying figures show details of this embodiment according to the principles of the invention.

For the best understanding of the use and operation of a ring bit accumulator in accordance with the present invention some knowledge of the computing device known as the Rockwell Integrator is required.

The Rockwell Integrator is an instrument designed for use in the computation of flow charts derived from use of the orifice meter in gas distribution systems. Calculation of the chart record has been necessary to determine the exact volume of gas that has passed for any interval of time. The Rockwell Integrator is an instrument which computes and adds the instantaneous square root values of the product of two variables; that is the differential and absolute static pressures.

The mechanical portion of the integrator includes three discs or plates; the smaller being the time plate, the intermediate being the pressure plate, and the large being the chart plate. The time plate and chart plate are geared together in a constant ratio and driven by a variable speed A.C. or D.C. motor. The pressure plate is positioned above the time plate and between these plates contacting them is a small steel disc roller, the pressure roller which can be moved across the face of the time plate from a center to the right outer edge. By moving the position of the pressure roller the speed ratio between the time plate and pressure plate can be changed. A second roller termed the differential roller can be moved across the top surface of the pressure plate, and connected to this roller is a dial counter. Thus the resultants obtained from the counter are dependent upon the frictional speed ratio changes which are governed by the positions of the rollers moving across the plate.

Two inking pens which are manually positioned and controlled rest upon the larger plate or chart plate upon which the flow meter chart is placed. One of these pens is known as the pressure pen and transmits its position or movement through levers to the pressure cam which in turn governs the relative position of the pressure roller. The other pen known as the differential pen transmits its position or movement in a likewise manner. Thus the position of these rollers with respect to plate surfaces will correspond in revolutions to the square root of the absolute pressure being registered at that instant by the differential pen.

The differential pen on the integrator follows the chart line on the chart. The pressure pen does not follow the chart line of the chart but will describe a parallel line to that of the differential. The Rockwell Integrator is designed to calculate Rockwell, Foxborough and Wescott orifice meter charts in most any pressure or differential range in various combinations of atmospheric pressures. Two control arm levers are so designed to enable the operator to move both the differential and pressure pens across the chart from zero to the outer edge or maximum limit of the scale. A control lever operated with the right hand actuates the differential pen and the lever operated with the left hand actuates the pressure pen. These pens are color coded with differential in red and the static in black, to enable the operator to glance at the pens with the assurance that the red pen is tracing over the differential line and the black pen over the pressure line. Thus the operator moves the control levers which enable the respective pens to follow the corresponding pressure and differential lines on the chart as recorded by the meter. Simultaneously the pressure and differential carriages to which square root cams are attached, are moved on the slide rods. Cam roller arms held against the edge of the cams by spring tension move across the curve of the cam. The cam roller arms are directly connected by linkage to the pens and the chart and also actuate with them. The charts to be integrated are usually provided with back printing and the operator notes the initial counter reading in the space provided. The chart is so positioned that when the tracing is completed the chart is removed and another reading noted in the space provided for stop reading. The difference between the top and initial counter readings gives the integrated value of the chart. This then is multiplied by the integrator constant for that particular chart range to give the extension to which the orifice coefficient can be applied to determine the total flow. The mechanical counter provided is of the continuous type which trips over on a reading of 9999.

It has been found desirable to equip the Rockwell Integrators with a device that would automatically print out the "machine difference" or extension. This device would eliminate the requirement for the operator to enter the start and finish readings from the mechanical counter and obtain a difference between these two readings by use of a printing calculator.

The mechanical drive from the chart plate through the time plate, the pressure roller and the pressure plate to the differential roller are rotating variables proportional to time, static pressure, and "machine difference."

With the machine constants derived in this manner, it is possible to provide printout of data which would permit calculation of average pressure without further handling of a chart.

Accordingly, the ring bit accumulator is designed to convert the information developed in a Rockwell Integrator into numerical data and present this data for recording.

The ring bit accumulator is designed to count the revolutions of the time plate, pressure plate and differential disc in the integrator and print this information. This is done with a photo detector associated with each plate and disc. The time plate has five silver segments equally spaced around its rim, the pressure plate has eight silver segments along its rim, and the differential disc has ten silver segments on its base. The photo detector recognizes the silver segments and presents these recognitions as counts to the accumulator. The counts are accumulated in a combination of solid state and electromechanical counters and can be printed out on demand. The print out function is performed on a mechanical data log printer such as the Model MC-215 manufactured by the Monroe Calculating Machine Co., which is capable of printing ten digits. Four digits are used for the count on the differential wheel, and three digits are used for each of the counts of the pressure and time plates.

Figure 10:
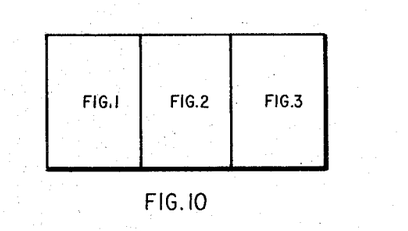
FIG. 10 shows the manner for assembling FIGS. 1, 2 and 3 for a proper understanding.

The computing of the chart record is necessary to determine the exact volume of gas that has passed an orifice meter for an interval of time (the orifice meter produces the original traces on the graph). This information is required in billing the gas consumer. The description of the equipment included in the accumulator, referring to FIGS. 1, 2 and 3 taken in combination as shown in FIG. 10, is as follows.

Figure 1:
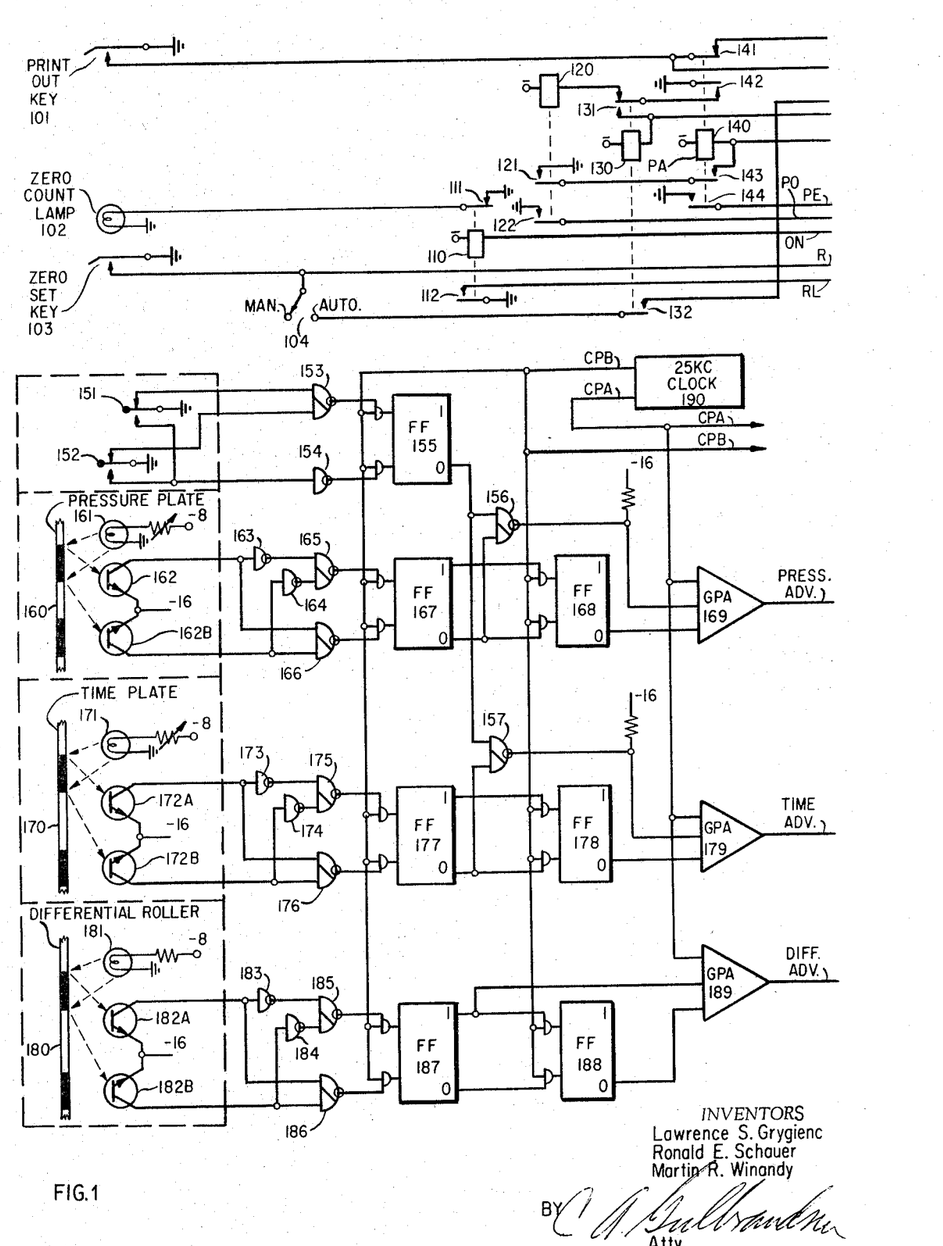
FIGS. 1, 2 and 3 comprise a diagrammatic representation of a ring bit accumulator and associated printer in accordance with this invention.

Photo detectors such as 162A and B, 172A and B, and 182A and B are basically silicon planar transistors without a base input. The base is controlled by light entering the lens of the transistor. A high intensity light causes the transistor to conduct, and lack of light will force the transistor into cutoff. By way of example when transistors 162A and 162B receive a relatively large amount of light, they cause a −16 volts to be conducted to the inputs of inverter circuits 163 and 164. Inversions of these signals then are applied to gate 165 which in the presence of the two inverted or "zero" signals produces a "one" output. The output of gate 166 in response to the receipt of two "one" inputs from transistors 162A and 162B will produce a "zero" output. When the photo transistor goes into cutoff the self biasing of the gates causes them each to revert to the opposite state. That is gate 165 will assume a "zero" condition and gate 166 will produce a "one" output.

There are two photo detectors for each of the three inputs. The detectors are mounted so that each detector focuses on a silver sector exposed to light, at different points. These prevent detection of a silver sector at its boundary because both detectors have to be exposed to light to allow the logic to accept the count. As shown in FIG. 1 light transmitted from light source 161 is reflected by the silver segment on plate 160 to photo transistor 162A and to photo transistor 162B. The reflection of light being from the same silver segment but different portions of that segment.

The accumulator is made to count in the following manner. First it must be assumed that all counters are in a "zero" count condition, all flip-flops are in their reset condition and all rotary switches are in the home position, and that no printout or reset operations have been initiated.

Figure 2:
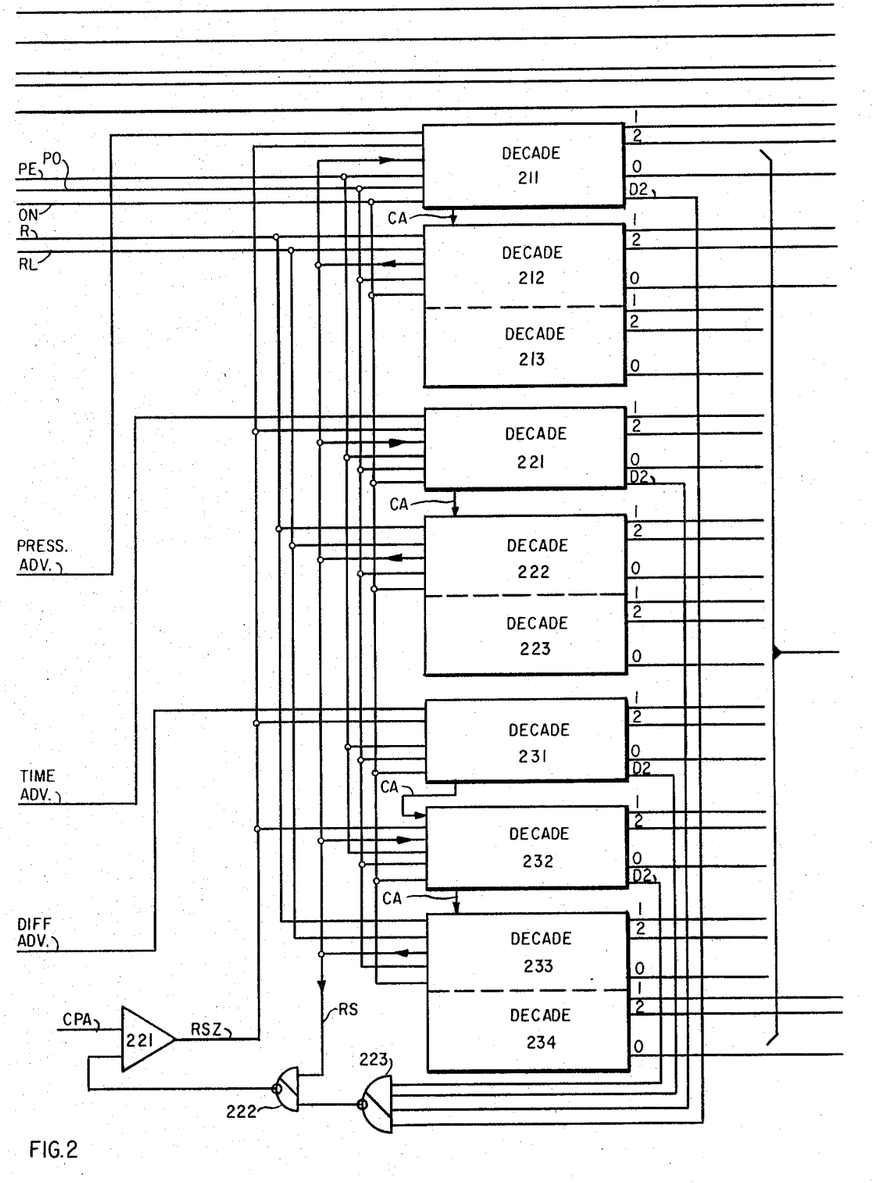

Referring first to the counter composed of decades number 211, 212 and 213 that form the counter for the pressure plate 160. A count is accumulated for every passage of a silver segment on the pressure plate 160 before the associated photo transistors 162A and 162B. When ten pulses are accumulated in decade 211 a carry pulse is generated in that decade and transmitted to decade 212 causing it to register. The decade counter 211 meanwhile has reset and is ready to accumulate ten more counts. Likewise after an accumulated count of ten has been accumulated in decade counter 212, a carry pulse is provided for decade 213 and is accumulated as its first digit. The continued operation and receipt of reflected light from the silver segments on the pressure plate 160 will cause the first decade 211 to accumulate a single digit for each pulse received from the input circuitry. Decade 212 will accumulate one digit for each ten digits accumulated by decade 211 and decade 213 will accumulate one digit for each ten digits accumulated in the decade 212. Obviously the limit of the first counter comprised of decades 211, 212 and 213 is an accumulated count of 999 after which the entire counter will reset to "zero."

Referring first to FIG. 1 for a detailed description, when both photo detectors 162A and 162B receive light reflected off of one of the silver segments of pressure plate 160, originating from light source 161, the inverters 163 and 164 assume a "zero" output. This fully enables gate 165 which puts a "one" output on the set lead of flip-flop 167. When the next 25 kc. clock pulse CPB occurs, flip-flop 167 will be set. All of the flip-flops in FIGS. 1, 4, 7 and 8 are shown in their set condition, i.e. the upper output is at a "one" or true condition and the lower output is at a "zero" or false condition. Naturally when the flip-flop is reset, the opposite condition occurs. Flip-flop 160 will not respond however until the next CPB pulse occurs, so it remains in its reset condition. Assuming for the moment that a "one" exists at the output of inverter 156. The purpose of this inverter and its associated logic circuitry will be discussed in detail later. The presence of a "one" condition at the output of inverter 156, and flip-flop 168 in the reset state in combination with the next occurring CPA pulse from the 25 kc. clock will enable gated pulse amplifier 169. This enabling transmits the advance pulse to the pressure plate counter, shown in FIG. 2, which consists of decades 211, 212 and 213. The following CPB pulse will set flip-flop 168 causing a "zero" output. Since there is no longer coincidence of three "one" pulses at the input of gated pulse amplifier 169, it will be inhibited and will not pass future CPA pulses until such time as another input pulse is received from the photo detectors 162A and 162B.

Referring now to FIG. 2, the pressure plate counter consists of decades 211, 212 and 213. The detailed circuitry of decade 211 is shown in detail in FIG. 4 which should be used in combination with FIG. 2, like wise the advance logic 450 used in decade counter 211 is shown in detail in FIG. 7 and should be referred to also.

Figure 4:
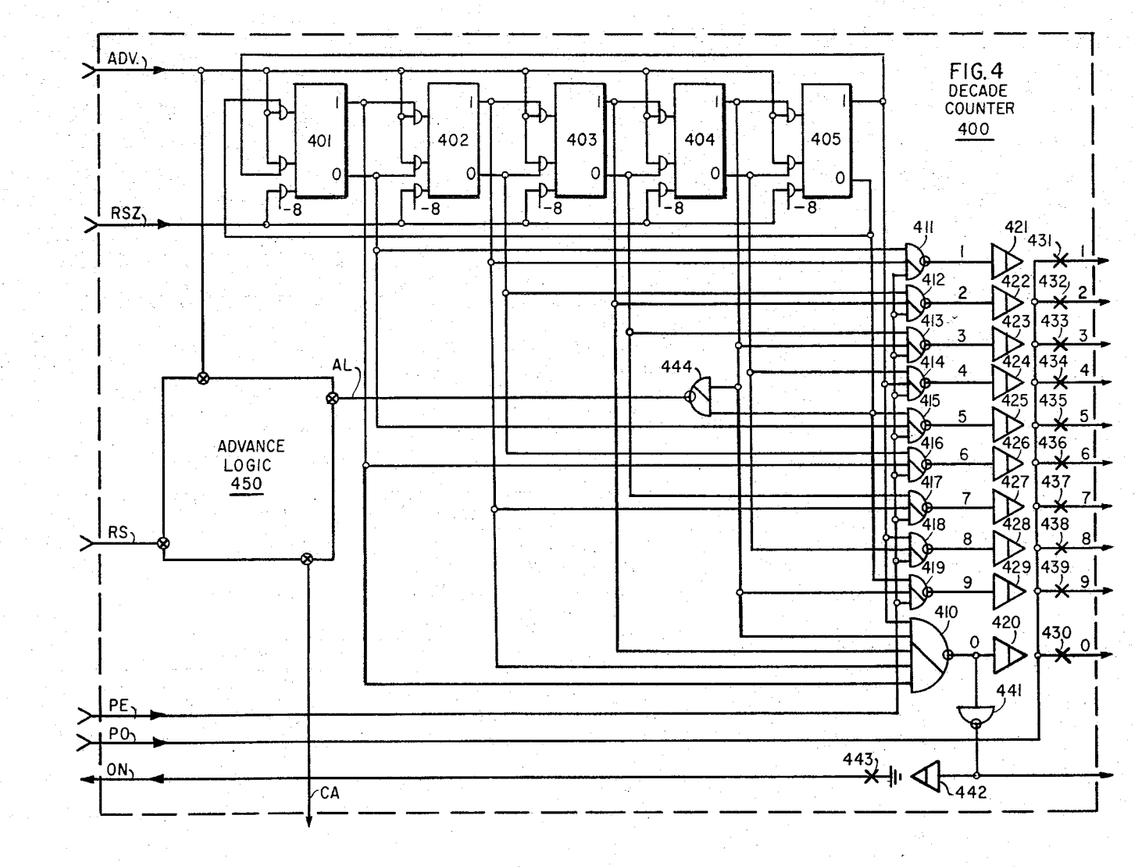
FIG. 4 is a schematic diagram of a decade counter using solid state components.

Flip-flops 401, 402, 403, 404 and 405 are in their reset condition. It may be observed that the advance pulse is coupled to the set inputs of all five flip-flops. However only flip-flop 401, because it is partially set by virtue of its coupling to "zero" output of flip-flop 405, will be set to the true condition. As may be observed the gates 410 through 419 are of the NOR logic type and are coupled to the outputs of flip-flops 401 to 405 on a coded basis. They also are gated by a PE pulse originated in the operation of relay 140, which extends ground (zero) at its contacts 144.

With flip-flop 401 in its set condition the "zero" output from its lower terminal will be conducted to inverter 411, likewise a "zero" output from the upper terminal of flip-flop 402 is conducted to inverter 411 so that if a "zero" input marking is present on lead PE a "one" condition will exist at the output of inverter 411, this is applied to relay driver 421 which will cause the operation of its associated glass encapsulated reed relay (not shown) to close its associated contacts 431. Closure of these contacts will apply ground at the number 1 output of the decade counter 411 if ground is present on lead PO. Ground is present on this lead in response to operation of relay 120. Ground being applied at its contacts 122. The operation of relay 120 will be discussed later.

Figure 5:
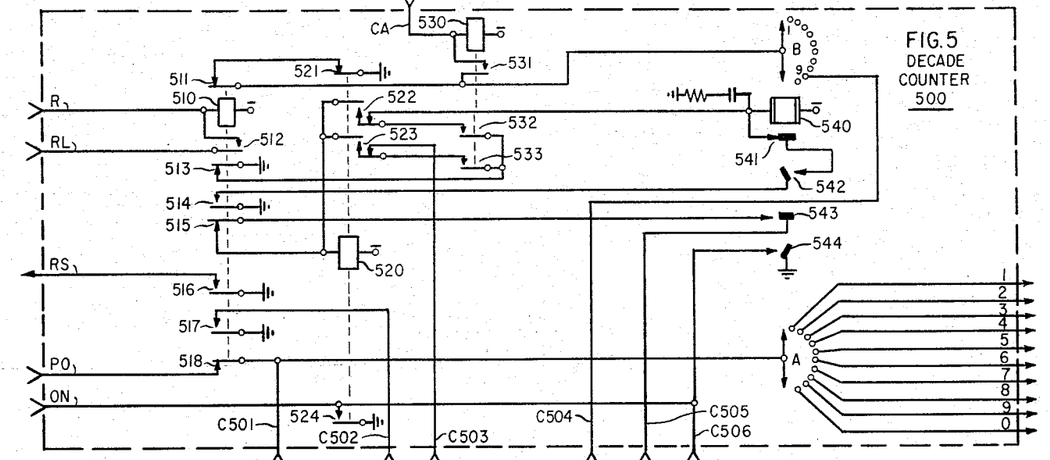
FIGS. 5 and 6 are schematic diagrams of electro-mechanical decade counters in accordance with this invention.

Subsequent advance pulses received at decade counter 211 will affect the flip-flops 401, 402, 403, 404 and 405 in the following manner: a second advance pulse will set flip-flop 402, a third will set flip-flop 403. A fourth advance pulse will set flip-flop 404 and a fifth advance pulse will set flip-flop 405. Since the upper output of flip-flop 405 is coupled to the reset input of flip-flop 401 the sixth advance pulse will reset flip-flop 401, a seventh will reset flip-flop 402, an eighth advance pulse will reset flip-flop 403 and a ninth advance pulse will reset flip-flop 404. When flip-flop 404 is reset a "zero" condition at its upper output and the "zero" condition existing at the lower output of flip-flop 405 are effective to produce a "one" output at inverter 444. This "one" output on lead AL is conducted to the advance logic 450 shown in detail in FIG. 7, where when the next advance pulse is received from the input circuitry it will be effective to set flip-flop 701. The setting of flip-flop 701 will operate relay driver 704 to extend ground at its contacts 705 via lead CA to decade 212, the detail circuitry of which is shown in FIG. 5 as decade counter 500. This input on lead DA will be effective to actuate decade counter 212 to register the first tens digit. Simultaneously the last received advance pulse will reset flip-flop 405.

At this moment it can be seen that decade counter 211 as exemplified by decade counter 400 shown in detail in FIG. 4 has returned to the all zero condition and simultaneously an advance pulse has been applied to decade counter 212 to register the first digit there as an indication of the quantity 10.

Referring now to decade counter 500 shown in FIG. 5 which is a detailed representation of a counter like that of decade 212. The application of ground to lead CA is effective to operate relay 530. Relay 530 locks to ground as its contacts 531 over a path extending through contacts 511 and 521. Operation of relay 530 also completes a path to the motor magnet 540 of the rotary switch associated with decade counter 500. This ground is extended through contacts 513, 532 and 522 to the motor magnet. A path is also prepared to the decade counter 600 shown in FIG. 6 at contacts 533. Application of ground to the motor magnet 540 will cause it to activate the cock in preparation for a forward stepping motion of its wipers on level A and level B to the first bank contacts. As the switch cocks interrupter contacts 543 will extend ground forwarded from the decade counter 600 via contacts 611 of relay 610 through the interrupter springs 543 and contacts 515 to relay 520. In response to ground, relay 520 operates and at contacts 522 breaks the operating path for motor magnet 540. Motor magnet 540 restores and the wipers on levels A and B of the rotary switch 540 advance to the first bank wiper. At the time that the rotary switch operates off normal contacts 544 close to extend ground via lead ON to relay 110 of FIG. 1. When rotary switch 540 restored ground was removed from relay 520 at interrupter contacts 543 so that relay 520 restores, restoring the operating path for motor magnet 540 at contacts 522. Meanwhile the resetting of all of the flip-flops in counter 400 to "zero" cause the "one" input on lead AL to flip-flop 701 to change to a "zero," so that in combination with the tenth advance pulse converter 702 will apply a "zero" signal to the reset input of flip-flop 701. Flip-flop 701 will be reset causing ground to be removed at contacts 705 from lead CA. With ground no longer present on lead CA relay 530 restores. The decade counter 500 which exemplifies the decade counter 212 of FIG. 2 is now prepared to accept a second input pulse indicative of ten more counts of counter 211. Or in other words ready to record the number 20.

Figure 6:
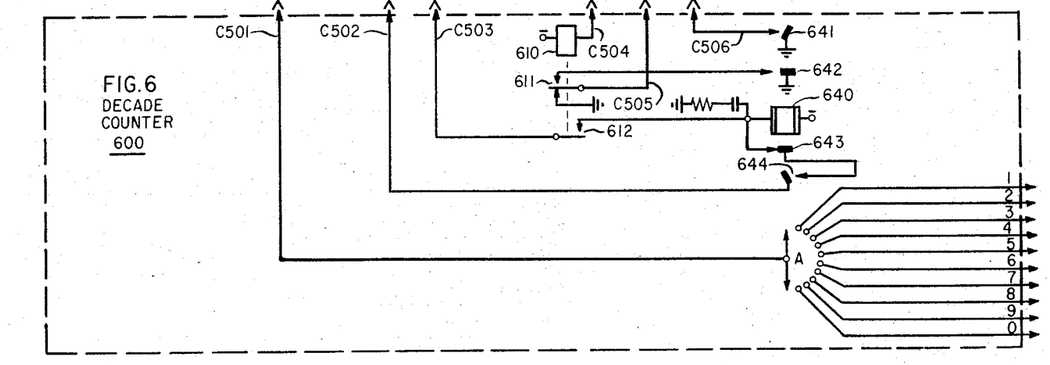
Figure 7:
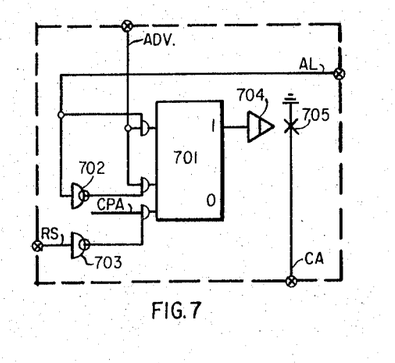
FIG. 7 and FIG. 8 are schematic diagrams of logic circuitry usable in the solid state decade counter of FIG. 4.
Figure 8:
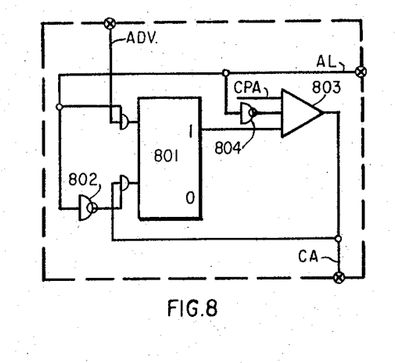
Figure 9:
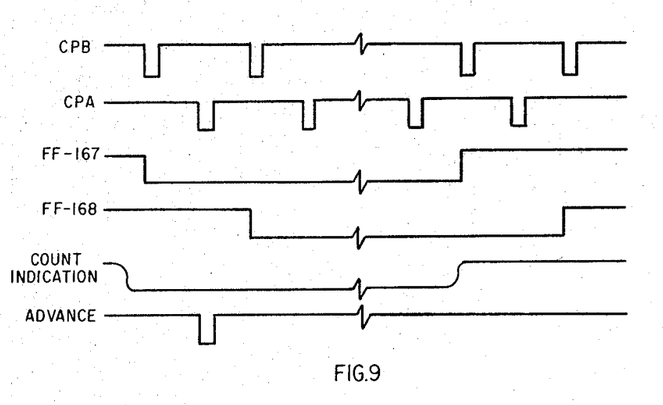
FIG. 9 is a timing chart showing the relationship of the clock pulses, input circuitry and logic circuitry utilized in connection with the counters according to this invention.

When counter 212 has counted eight digits, indicative of eighty input pulses from the pressure plate input circuitry, it prepares decade counter 213 exemplified by decade counter 600 shown in detail in FIG. 6 to receive a first impulse indicative of a count of 100. This is accomplished in the following manner. When the ninth pulse is received by decade counter 500 indicative of the number 90 the wiper on level B will advance to the ninth bank contact. When the relay 520 restores after completion of the step as previously outlined, ground will be extended via contacts 521 and 511 through the wiper on level B to the ninth bank contact where it will be further extended to relay 610 of the decade counter 600, which shows the detailed circuitry utilized in decade 213 of FIG. 2. Extension of ground will operate relay 610. Relay 610 now prepares an operating path for motor magnet 640 of the rotary switch associated with the decade counter 600 at contacts 612. When the next or tenth pulse indicative of a count of 100 is received at lead CA of decade counter 500 relay 530 will operate in a manner previously described and ground will now be extended through contacts 513, 532 and 522 to motor magnet 540 in the manner previously described and ground will be extended through contacts 513, 533 and 523 and contact 612 of counter 600 to the motor magnet 640 causing the rotary switches in counters 500 and 600 to cock or prepare themselves to step to the next position. Inasmuch as relay 610 is operated, ground for the operation of relay 520 will now be extended through interrupter spring 642 and the contact 611 through interrupter spring 543 and contacts 515 to relay 520 causing it to operate, thereby moving the operating ground for motor magnets 540 and 640 at contact 522 and 523 respectively. With the removal of ground the bank wipers associated with levels A and B of rotary switch 540 of counter 500 and level A of rotary switch 640 associated with decade counter 600 will advance one step. Decade counter 500 will then have its wipers on the tenth position and decade counter 600 will have the wipers of its associated switch on the first contact indicating a count of 100. The counters 211, 212 and 213 are made to operate in the manner outlined until they have accumulated a count of 999 after which they reset to a count of 000.

The time plate counter consisting of decade 221, 222 and 223 operates in exactly the same manner.

The differential roller counter consisting of decades 231, 232, 233 and 234 while basically similar to the pressure and time counter differs in that decade 231 and 232 are both of the type shown in detail in FIG. 4 and decades 233 and 234 being shown in detail in FIGS. 5 and 6 respectively. However the advance logic 450 utilized in the decade 231 is that shown in detail in FIG. 8. The advance logic for decade 232 is that shown in FIG. 7.

Operationally the differential counter functions in the same manner as the previously described counters except that when the ninth advance pulse is received by decade 231, and the inverter 444 produces a one output as previously described the one output conducted via lead AL to flip-flop 801 in combination with the ninth advance pulse set flip-flop 801. The "one" condition at the upper output of flip-flop 801 is applied to gated pulse amplifier 803. Inasmuch as the same "one" signal on flip-flop AL will be inverted by inverter 804 this presents a "zero" signal to the gated pulse amplifier 803 so that even at the application of the next CPA pulse the output of GPA803 will continue to be a zero. When the tenth advance pulse is received by decade counter 231, the flip-flop shown in detail in FIG. 4 as flip-flop 405 will be reset producing a "one" input to gate 444. As a result the condition on lead AL will now be "zero." This "zero" condition will be inverted by gate 804 of FIG. 8. When taken in combination with the "one" output of flip-flop 801 and the next CPA pulse a "one" output pulse will be produced by gated pulse amplifier 803. This pulse will appear on lead CA, and is coupled to the ADV terminal of decade 232 where it will be utilized as an advance pulse to set the flip-flop 401 of decade 232 to indicate a count of "one" in that counter. Since decade 232 is the tens decade counter for the differential counter this is indicative of a count of ten from the differential roller input circuitry. The "one" output of gated pulse amplifier 803 in combination with the inverted "zero" condition on lead AL by inverter 802 will be presented to the reset input of flip-flop 801, causing it to reset and block gated pulse amplifier 803, terminating the advanced pulse presented to decade 232. Decades 231 and 232 will continue to accumulate the count of advance pulses received from the differential roller input circuitry until a total count of 90 is received at which time the advance logic circuitry of decade 232 shown in detail in FIG. 7 will prepare to transfer the 100th advance pulse to decade 233 in a manner similar to that described in connection with the carry or transfer of the tenth pulse from decade 211 to decade 212.

When decades 211, 221, 231 and 232 have all reset; the flip-flops in each exemplified by 401, 402, 403, 404 and 405 will all present "zero" conditions to gate 410 which will then produce a "one" output. This output in addition to providing a "zero" marking for the printer circuitry at contacts 430 by virtue of operation of relay driver 420 and its associated relay will through inverter 441 and via lead DZ apply "zero" conditions to all the inputs of gate 223 to enable it. Likewise the same inversion of signal from the output of inverter 441 will remove the operating signal from relay driver 442 removing ground at its associated contacts 443 from lead ON.

When counters 212, 222, 233 shown in detail in FIG. 5 and counters 213, 223 and 234 shown in detail in FIG. 6 are also in their zero or tenth position their associated off normal springs 544 and 644 respectively have also removed ground from lead ON extending from FIG. 5. Lack of presence of ground on the ON leads from all of the counters will cause relay 110 of FIG. 1 to restore which in turn will restore ground via contacts 111 to the zero count lamp 102 permitting an operator to visually note that the entire apparatus is registering a "zero" count.

Figure 3:
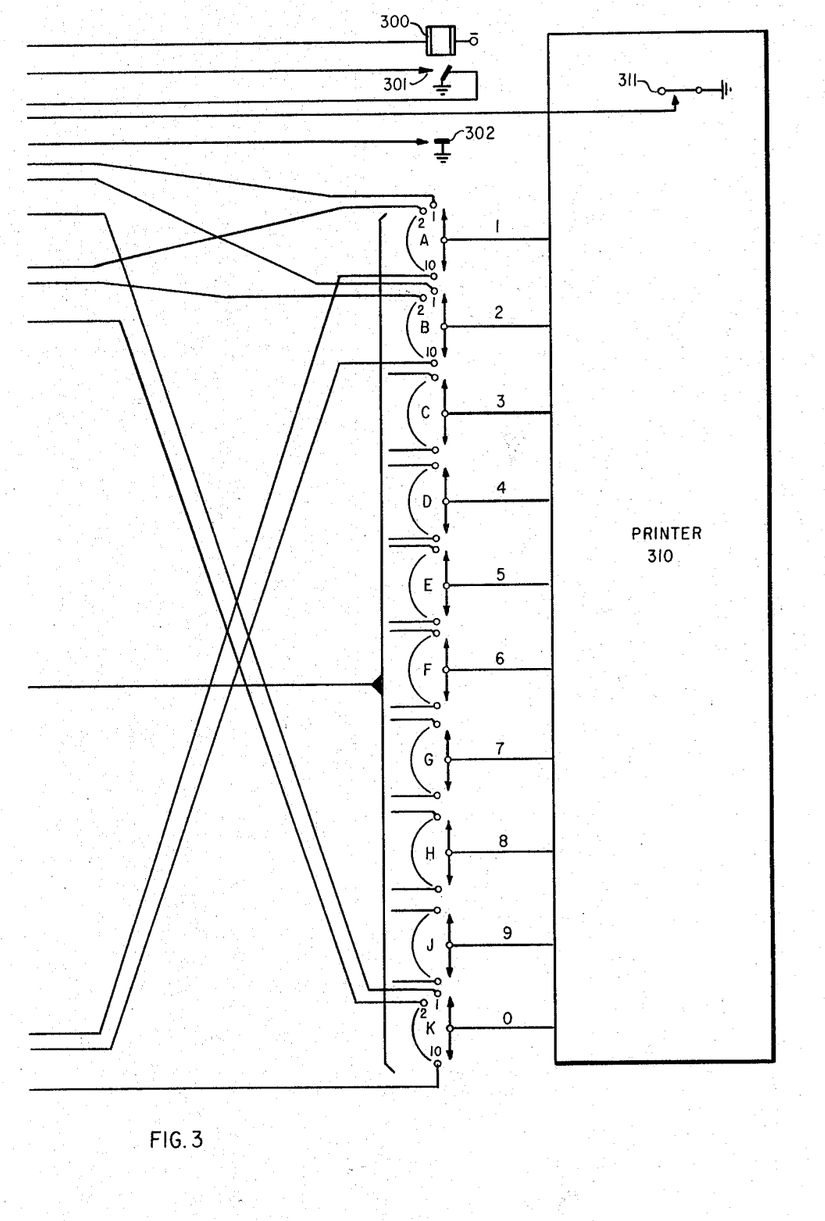

The manner in which the count from the pressure plate, time plate and differential roller is accumulated and subsequently stored in the decades 211 through 234 has been described; the manner in which the counter is operated in connection with the Rockwell Integrator and caused to register an accumulated count will now be described. Reference should be made to FIGS. 1, 2 and 3 and the detailed circuitry of FIGS. 4, 5 and 6.

If the zero count lamp 102 is not lit when the operator prepares to trace a chart prepared by an orifice meter, the operator will first operate the zero set key 103. This key will conduct ground to decades 212, 222 and 233 where as may be noted by referring to FIG. 5 relay 510 will operate. Operation of relay 510 in each of these counters will cause relay 510 to lock to ground at its contacts 512 extended back to contacts 112 of the relay 110 which will be operated as long as a count other than zero is present in any of the decades shown in FIG. 2. The operation of relay 510 will also extend ground at contacts 514 to the off normal springs 542 which will be closed if the rotary switch 540 is indicating any count at this time, through the interrupter springs 541 to the motor magnet 540. Likewise ground is extended via contacts 517 through off normal springs 644, and interrupter 643 to motor magnet 640 shown in FIG. 6. Application of ground at contacts 516 and 517 therefore is effective to cause motor magnets 540 and 640 to operate the associated rotary switches in a self interrupted manner until such time as the switches return to their normal or zero position at which time the off normal springs 542 and 644 will open to remove operating ground from motor magnets 540 and 640 respectively. The opening of contacts 515 also prevents the operation of relay 520 during the resetting phase thus preventing application of ground at 524 to lead ON.

When relay 510 operated, ground was applied at contacts 516 to lead RS. Ground indicative of a "zero" condition was extended to gate 222. If any of the decades 211, 221, 231 and 232 are not in the "zero" condition a "zero" output will exist at gate 223. This combination will enable gate 222 to produce a "one" output which will be extended to gated pulse amplifier 221 where on the occasion of the next CPA pulse it will produce a "one" pulse for application to the reset inputs of all the flip-flops in counters 211, 221, 231 and 232. If a "one" output is present at gate 223 indicating that these decades are already reset the presence of "zero" on lead RS will be ineffective. If ground is present on any of the RS conductors from decades 212, 222 and 233 this ground will also be conducted to the advance logic of decades 211, 221 and 232 where it will be inverted by inverter 703 shown in FIG. 7, for a "one" output which in conjunction with the next CPA pulse will reset flip-flop shown in detail as 701 in FIG. 7 in decades 211, 221 and 232. The flip-flop 801 shown in FIG. 8 which is utilized as the advance logic circuitry of decade 231 resets in the manner previously described.

Assume now that the operator has placed an orifice meter chart upon the chart plate of the Rockwell Integrator in the manner previously described. When properly positioned the chart plate latch is released and microswitch 151 is restored to its normal position wherein ground is applied to gate 153. During the process of rotation if the differential pen is moved past its zero point its associated microswitch 152 will be opened. If however the switches remain in a normal condition gate 153 will produce a "one" output which in connection with clock pulse CPB will maintain flip-flop 155 in the set condition. As long as flip-flop 155 is set its lower output will be zero. This "zero" output in connection with a "zero" condition at the lower output of flip-flop 167 will provide a "one" condition at the output of gate 156 and will permit gated pulse amplifier 169 to present advance pulses to the pressure counter consisting of decades 211, 212 and 213. Likewise the "zero" condition from flip-flop 155 in connection with the "zero" condition present at the lower output of flip-flop 177 will enable gate 157 to produce the necessary gating condition for gated pulse amplifier 179 so that the time plate counter consisting of decades 221, 222 and 223 can count the time advance pulses transmitted from the time plate input circuitry. If at any time either microswitch 151 or 152 are caused to operate as might occur in the case of overrun or chart rotation through periods of zero measurement, flip-flop 155 will be reset producing a "one" condition at the inputs of gates 156 and 157 thereby preventing the gated pulse amplifiers 169 and 179 respectively from transmitting additional advance pulses to the associated counters.

Assume now that a chart has been traced in the manner described previously; and the operator desires to record the information accumulated in the counter shown in FIG. 2 on the reverse side of the orifice meter chart. The operator will remove the chart from the chart plate and place it in the printer 310 of FIG. 3, the operator will then operate printout key 101 causing ground to be conducted to motor magnet 300 associated with the read out rotary switch shown in FIG. 3. This momentary ground will cause rotary switch 300 to cock and in so doing apply ground via interrupter springs 302 to relay 140, relay 140 will operate breaking the connection between the printout key 101 and motor magnet 300 at contacts 141 at which time rotary switch 300 will step its wipers to the first position on banks A–K respectively and return ground at off normal springs 301. Operation of relay 410 extends ground at contacts 142 through contacts 131 to relay 120 causing it to operate where at its contacts 121 it extended ground through contacts 143 to relay 140 for locking purposes. Relay 140 also extended ground at its contacts 144 and via lead PE to the decades 211, 221 and 232 as shown in detail in FIG. 4 this ground is effective to provide an enabling signal for gates 411 through 419 of each of the aforementioned counters.

Assume now that the count accumulated in the pressure plate counter consisting of decades 211, 212, and 213 to be 111, that the count accumulated in the time plate counter consisting of decades 221, 222 and 223 to be 222 and that the count accumulated in the differential roller counter consisting of decades 231, 232, 233 and 234 is 1122.

When ground from contact 844 is conducted to decade 211 gate 411 indicating a count of one will be enabled and conduct a signal to relay driver 421 which in turn will operate to close its contacts 431. The operation of relay 120 in response to the operation of relay 140 provides ground at contacts 122 on lead PO which in turn is conducted to decades 211, 212 and 221, 222, 231, 232 and 233. Ground on PO lead of decade 211 as shown in FIG. 4 will then extend through closed contacts 431 on the number "one" output of decade 211. Output number one of decade 211 is cross connected to the first bank contact on level A of the rotary switch 300 the wipers of this level are connected to the solenoid (not shown) associated with the printing of the digit "one" in the printer 310. It may be observed number two output of decade 211 is connected to the first bank contact of level B which is connected to the solenoid associated with the printing mechanism of the digit two in the printer 310 etc. Since ground is present only on the number "one" output of decade 211 the solenoid of printer 310 for the digit "one" will be caused to operate. At such time as the print is complete ground will be returned from the printer mechanism at contacts 311 to relay 130. Relay 130 will operate by breaking the operating path for relay 120. With the restoration of relay 120 ground will be removed at contacts 121 from relay causing it to restore and ground will also be removed from lead PO so that the solenoid then being actuated in the printer 310 will be permitted to restore. When relay 140 restores ground is also removed from lead PE which was removed from lead PE which was utilized to enable the gate associated with the count accumulated in each of the counters. When relay 140 restored the operating path for relay 120 was also broken at contacts 142 as was its own holding path at contacts 143. The ground now present via off normal springs 301 of the rotary switch 300 shown in FIG. 3 is conducted through restored contacts 141 to the motor magnet 300 causing the motor magnet 300 to step its associated wipers on levels A through K to the second bank contact on each level. The second bank contact on each level is connected to decade 212 wherein the second digit to be recorded has been accumulated. As previously, relays 140 and 120 will operate and ground through contacts 122 will be conducted via lead PO to decade 212 shown in detail in FIG. 5. Ground on this lead will be conducted through contacts 518 and the wiper associated with level A of the rotary switch 540 and over bank contact one inasmuch as the digie "one" is accumulated in this count A ground on the number "one" output of decade 212 will be conducted to the second bank contact on level A via the associated wipers to the solenoid associated with the digit "one" of printer 310 in the manner previously described the second digit to be recorded by printer 310 will also be a "one." As previously, ground will be returned by the printer 310 and its associated contacts 311 to operate relay 130 which will cause relay 120 and then relay 140 to restore. Rotary switch 300 will advance its associated wipers on levels A through K to the third bank contact, relays 140 and 120 will again operate, ground will be transmitted via lead PO, contacts 518 and conductor 501 over the wiper associated with rotary switch 640 and its associated first bank contact to the third bank contact not shown on level A of rotary switch 300 and this ground will be conducted to the associated bank wiper to the solenoid associated with the digit "one" causing it to operate in the printer 310. In this manner the count accumulated in the pressure plate counter consisting of decades 211, 212 and 213 which was 111 has now been recorded by printer 310.

In a similar manner the count accumulated in the time plate counter consisting of decades 211, 222 and 223 which was 222 will be recorded except that in this instance operation of relay 140 to cause ground to be extended at contacts 144 via lead PE to decade 221 will cause gate 412 shown in detail in FIG. 4 to be enabled causing associated relay driver 422 to be operated so that ground extended from relay 120 via lead PO to relay contact 432 will be extended over the number two output of decade 221. Decade 221 will have its outputs one to zero respectively connected to the fourth bank contact on levels A through K respectively of the rotary switch 300. In this manner when the rotary switch has stepped to the fourth position, the fourth digit to be recorded by the printer will be the digit two. Ground extended from decade 221 via its number two output to the fourth bank contact on level B will be conducted to the solenoid in the printer 310 associated with the digit two. In response to this ground the solenoid will operate and the digit two will be printed as the first digit of the count accumulated in the time plate counter. In the manner previously outlined rotary switches 540 and 640 associated with decade counter 222 and 223 respectively will be stepped to their second position so that when ground is forwarded via lead PO it will be conducted to level B fifth and sixth bank contacts respectively so that the solenoid associated with the digit two will be reoperated twice more to fully record the count 222.

It will be recalled that the differential roller counter consisting of decades 231, 232, 233 and 234 had accumulated the count 1122. Decade 231 has its outputs "one" through "zero" connected to the seventh bank contacts of levels A through K respectively of the rotary switch 300. Decade 232 has its outputs "one" through "zero" connected to the eighth bank contact on levels A through K respectively and decades 233 and 234 have their outputs connected to the ninth and tenth bank contacts respectively of levels A through K of the rotary switch 300 associated with the printer 310 shown in FIG. 3. Therefore based on the previous description it should be noted that operation of the motor magnet 300 as it advances each time by virtue of ground applied at off normal contacts 301, will be effective to extend ground at interrupter contacts 302 to operate relay 140 and 120 respectively applying ground on leads PE and PO to enable gates 411 of decade counters 231 and 232 where the first two digits one and one are accumulated, and to transmit ground to contacts 431 at the number "one" outputs of decades 231 and 232. Likewise ground on lead PO will be effectively conducted via the wipers associated with level A of rotary switches 540 and 640 respectively, and the second bank contacts on those levels to the number two outputs of decades 233 and 234. Each time a digit is recorded by the printer 310 ground will be extended via contacts 311 to operate relay 130 which will cause relays 120 and 140 to restore and the motor magnet 300 to reoperate stepping the wipers on levels A through K to their next position. When the last digit has been recorded by virtue of the rotary switch stepping to its tenth position return of ground at contacts 311 will operate relay 130 to restore relay 140 causing ground to be extended via off normal springs 301 and contacts 141 to the motor magnet causing it to step once more at its home position. At this time off normal springs 301 will restore and motor magnet 300 will be blocked to further operation except from printout key 101.

The printer 310 will now have recorded the three digits 111 representative of the accumulated count in the pressure plate counter consisting of decades 211, 212 and 213; the digits 222 representative of the accumulated count in the time plate counter consisting of decades 221, 222 and 223; and the digits 1122 representative of the count accumulated in the differential roller counter consisting of decades 231, 232, 233 and 234. These ten digits will have been printed on the back of the orifice meter chart that was placed in the counter by the operator. The operator will now remove this chart and set the accumulator to zero and repeat the preceding operations.

What is claimed is:

1. A data accumulator comprising: data receiving means including a light source, a first and second photo transistor; and light reflecting means controlled by a data source periodically positioned to reflect light from said light source onto said photo transistors; a pulse source comprising an electronic clock producing a first train of equally spaced periodic pulses and a second train of equally spaced periodic pulses, said second pulses each occurring midway between pulses produced in said first train; counting means; gating means including a first flip-flop circuit connected to said photo transistors and to said electronic clock, a second flip-flop connected to said first flip-flop and to said electronic clock, and a gated pulse amplifier having individual circuit connections to said first flip-flop, to said second flip-flop, to said electronic clock and to said counting means, said first flip-flop set in response to the rendering of said first and second photo transistors conductive coincident with receipt of a periodic pulse from said first pulse train, said gated pulse amplifier operated in response to the setting of said first flip-flop and to the receipt of a first periodic pulse and said second pulse train, to transmit a count pulse to said counting means, said second flip-flop operated in response to the setting of said first flip-flop and to the receipt of a second periodic pulse received from said first pulse train, to terminate the operation of said gated pulse amplifier; said counting means operated in response to the receipt of said count pulses to register the number of times said first and second photo transistors are rendered conductive; recording means comprising a printer including advance means; and connecting means comprising an electromechanical stepping switch including, a motor magnet including circuit connections to said printer advance means, and a plurality of banks each including a bank wiper connected to said printer and a plurality of bank contacts connected to said counting means, said wipers operated in response to said motor magnet to connect said printer to said counting means; said printer operated in response to connection to said counting means to record the number of times said photo transistors are rendered conductive as registered in said counting means.

2. A data accumulator as claimed in claim 1 wherein are further included reset means comprising: a reset key connected to said counting means operated to erase the number of times said first and second photo transistors were rendered conductive as registered in said counting means; a reset indicator including circuit connections to said counting means operated in response to said erasure to indicate said erasure.

3. A data accumulator comprising:
data pulse receiving means;
counting means;
a pulse source;
gating means comprising a first flip-flop circuit connected to said receiving means and to said pulse source; a second flip-flop connected to said first flip-flop and to said pulse source; and a gated pulse amplifier having individual circuit connections to said first flip-flop, to said second flip-flop, to said pulse source, and to said counting means, said first flip-flop set in response to receipt of a data pulse from said receiving means coincident with a first periodic pulse from said pulse source; said gated pulse amplifier operated in response to the setting of said first flip-flop and to the receipt of a second periodic pulse from said pulse source to transmit a count pulse to said counting means, said second flip-flop operated in response to the setting of said first flip-flop and to the receipt of a third periodic pulse received from said pulse source to terminate the operation of said gated pulse amplifier;
said counting means operated in response to the receipt of said count pulses to register the quantity of data pulses received by said receiving means;
recording means;
and connecting means operated to connect said recording means to said counting means;
said recording means operated in response to connection to said counting means to record the quantity of data pulses registered in said counting means.

4. A data accumulator comprising:
data pulse receiving means;
counting means including first, second and third counters, said first counter comprising a first decade counter including a first plurality of flip-flops connected in a concatenated manner, a first plurality of outputs connected to said first flip-flops and first count advance means connected to one of said first plurality of outputs, a second decade counter including a second plurality of flip-flops connected in a concatenated manner and including a circuit connection to said first count advance means and a second plurality of outputs connected to said flip-flops, said second flip-flops operated in response to said first count advance means, and further including second count advance means connected to one of said second plurality of outputs, a third decade counter including a first stepping switch connected to said second count advance means in said second decade, operated in response to operation of said second advance means, third count advance means operated in response to said first stepping switch, and a fourth decade counter including a second stepping switch connected to said third count advance means and operated in response to said third count advance means;
a pulse source;
gating means connected to said pulse source, and further connected between said receiving and said counting means, enabled in response to receipt of periodic pulses transmitted by said pulse source coincident with the receipt of data pulses by said receiving means to transmit a plurality of count pulses to said counting means;
said counting means operated in response to the receipt of said count pulses to register the quantity of data pulses received by said receiving means;
recording means;
and connecting means operated to connect said recording means to said counting means;
said recording means operated in response to connection to said counting means to record the quantity of data pulses registered in said counting means.

References Cited by the Examiner

UNITED STATES PATENTS

| | | | |
|---|---|---|---|
| 2,714,841 | 8/1955 | Demer | 95—4.5 |
| 2,934,824 | 5/1960 | Baybrook et al. | 33—1 |
| 2,963,222 | 12/1960 | Allen | 235—151 |
| 3,081,031 | 3/1963 | Livesay | 235—160 |
| 3,205,484 | 9/1965 | Schwertz | 340—173 |

FOREIGN PATENTS 1,379,098  10/1964  France.

OTHER REFERENCES

Keister, Ritchie and Washburn: Design of Switching Circuits, Van Nostrand, 1951, pp. 179–186.

Millman and Taub: Pulse and Digital Circuits, McGraw-Hill, 1956, pp. 327–334.

MALCOLM A. MORRISON, *Primary Examiner.*

K. MILDLE, *Assistant Examiner.*